3,355,408
PROCESS AND COMPOSITION OF MATTER

James F. Mayer, Hinsdale, and Jack L. Harrier, Lansing, Ill., assignors to Standard Oil Company, Chicago, Ill., a corporation of Indiana
No Drawing. Filed Jan. 25, 1965, Ser. No. 427,929
6 Claims. (Cl. 260—29.6)

This invention relates to water-soluble resins and to methods of binding solid particles together in the presence of water. More particularly, the invention relates to a water-soluble resin which provides water compatibility for a water-insoluble, polymerizable monomer such as styrene to form an aqueous solution, and to a method of binding sand or similar particles together in an aqueous environment to form a solid mass which resists erosion.

Erosion of sand beaches and other sand shore lines, due to wave and tide action, has resulted in considerable damage to the beaches and to residential and business structures supported on sand. The erosion causes particular problems in areas such as Florida, where tropical storms are more frequent than in other regions and the wave and tidal actions are more severe.

Numerous procedures have been followed to reduce the erosion of the sand beaches and sandy shore lines. Land owners have used giant, unsightly rocks in an attempt to preserve their sand beaches. Another approach has been to set up small pumping stations to continually replenish beaches that are washed away. However, these have not provided entirely satisfactory results. Attempts have been made to develop resins which will gel or semi-solidify stretches of sand to minimize erosion. However, since the sand is in an aqueous environment, the presence of water has severely inhibited the curing of these resins. Therefore, the attractiveness of this approach has been limited.

We have discovered a method for binding the sand particles together while the sand remains in an aqueous environment. We have also discovered that the binder for the sand can be cured under ambient temperature conditions. Our discovery results in a practical method of binding sand particles together to form a solid mass which resists erosion. There is no need to remove the water from the sand prior to the application of the binder or to remove the water prior to the curing step. The binder not only can be applied to the sand particles when water is present but can be applied in concentrations as low as 2% by weight of binder based on dry sand.

In brief, the method of binding sand particles together is carried out by the use of a particular water-soluble unsaturated polyester which surprisingly provides water compatibility for a water-insoluble, polymerizable monomer such as styrene. The unsaturated polyester, when physically combined with the monomer in an aqueous solution in the presence of a catalyst which provides free radicals (such as a peroxy catalyst), cures at a low temperature and in the presence of an excess of water to form a thermoset binder for the sandy particles.

The particular unsaturated polyester which provides water compatibility for the water-insoluble monomer is prepared from the poly-condensation reaction product of a benzene tricarboxylic acid or anhydride thereof, a mono-olefinic unsaturated dicarboxylic acid or anhydride thereof, a benzene dicarboxylic acid or anhydride thereof, and an alkylene glycol. After the initial reaction has been completed, the reaction product is reacted with an alkaline, water-solubilizing agent, such as ammonia, an alkanolamine, or an alkali metal hydroxide. It is to be understood that mixtures of the particular acids may be utilized as well as mixtures of the acids and anhydrides.

The use of each of the acidic reactants is unnecessary to obtain the desired polyester. For example, if the benzene dicarboxylic acid is not used, the polyester does not provide water compatibility for the monomer such as styrene.

For convenience, the acids and their anhydrides are referred to as carboxyl-affording reactants. In this way, the benzene tricarboxylic acids and anhydrides, the mono-olefinic unsaturated dicarboxylic acids and anhydrides, and the benzene dicarboxylic acids and anhydrides may be considered to be benzene tricarboxyl-affording reactants, mono-olefinic unsaturated dicarboxyl-affording reactants, and benzene dicarboxyl-affording reactants, respectively.

In the method, the sand particles (or other similar solid particles) are treated by contacting them with a combination of the water-soluble unsaturated polyester and the water-insoluble monomer in the presence of water. Advantageously, the combination of polyester and monomer is in the form of an aqueous solution. The contacting step is also carried out in the presence of a free radical providing catalyst for a time to cause the polyester to cure and thereby form a thermoset binder. Suitable free radical providing catalysts are those which form free radicals at low temperatures. These include catalyst systems and, more advantageously, catalyst-promoter systems which are readily determinable from sources such as "Handbook of Reinforced Plastics of the SPI" by Oleesky and Mohr, Reinhold Publishing Company, 1964, Chapter II–1.9 and "Free Radicals in Solution," Cheves Walling, Cyrt. 1957; and include the peroxy catalysts, hexaphenylethane, and the like. Suitable peroxy catalysts are described in pages 48–51 of "Polyesters and Their Applications" by Bjorksten Research Laboratories, Inc. Advantageously, the catalyst-promoter systems are based on a peroxy catalyst.

The time for curing of the unsaturated polyester will depend on the particular catalyst system, the monomer, and the temperature at which the curing is carried out. With peroxy catalysts, times in the order of ⅓–15 mins. are common.

The water-soluble, unsaturated polyester which provides water compatibility for the water-insoluble monomer comprises the reaction product of (I) a polycondensation reaction product of (a) benzene tricarboxyl-affording reactant, (b) a mono-olefinic unsaturated dicarboxyl-affording reactant, (c) a benzene dicarboxyl-affording reactant and (d) an alkylene glycol having 2–6 carbon atoms, with the polycondensation reaction product having an acid number of about 20–100, and (II) an alkaline water-solubilizing agent.

Suitable benzene tricarboxyl-affording reactants include trimellitic acid, trimellitic anhydride, trimesic acid, hemimellitic acid, hemimellitic anhydride and the like. Advantageously, trimellitic acid and trimellitic anhydride are used.

Suitable mono-olefinic unsaturated dicarboxyl-affording reactants include fumaric acid, maleic acid, maleic anhydride, citraconic acid, itaconic acid and the like, and preferably the first three acidic materials. These acids may be further characterized as having 4 carbon atoms in the back bone and a total of 4–5 carbon atoms. They provide the unsaturation necessary to provide the thermosetting characteristic to the polyester.

Suitable benzene dicarboxyl-affording reactants include phthalic acid, phthalic anhydride, isophthalic acid, terephthalic acid and the like. Isophthalic acid is preferred. These acids in the defined polyester provide the water compatibility for the defined water-insoluble monomer.

Suitable alkylene glycols include the simple glycols and the ether glycols containing 2–6 carbon atoms. Examples of suitable glycols are ethylene glycol, propylene glycol, butylene glycol, pentanediol, hexanediol and the like, and diethylene glycol, dipropylene glycol, triethylene glycol and the like. The glycols provide the necessary hydroxyl functionality for the polyester. Advantageously, a mixture of the simple glycols such as propylene glycol and the ether glycols such as dipropylene glycol are used.

It will be understood that mixtures of the individual reactants may be utilized and that the individual reactants may be unsubstituted or substituted with the lower saturated hydrocarbon groups, such as methyl, ethyl and t-butyl; and halo groups such as chloro being illustrative of suitable substituents.

Generally, the benzene tricarboxyl- and mono-olefinic unsaturated dicarboxyl-affording reactants are present in a mole ratio of about 5:1–1:5, preferably about 2:1–1:2, and especially about 1:1, in order to achieve a suitable relationship between water solubility and unsaturation sites in the polyester. The benzene dicarboxyl-affording reactant is present in the water-soluble polyester in an amount sufficient to provide water compatibility for the water-soluble, polymerization monomer. The amount required depends on the amount of monomer; however, at least about ¼ mole per mole of the benzene tricarboxyl-affording reactant should be present and usually between about ¼ and 2 moles per mole of the benzene tricarboxyl-affording reactant provides very satisfactory results.

Sufficient glycol is charged to the reaction zone to react with the free carboxyl groups. Usually this is based on about 2 moles of glycol for each mole of the benzene tricarboxyl-affording reactant, plus 1 mole for each mole of mono-olefinic unsaturated dicarboxyl-affording reactant, plus 1 mole for each mole of benzene dicarboxyl-affording reactant. In some instances an excess of glycol is used. Usually, the glycol is about 85–120% and preferably 95–105% of the sum calculated from the acid usages.

The polyester is prepared by known polycondensation reaction conditions. The reactants are charged simultaneously to the reaction zone, or the mono-olefinic unsaturated dicarboxyl-affording reactant, benzene dicarboxyl-affording reactant, and alkylene glycol may be reacted first, followed by the reaction of the benzene tricarboxyl-affording reactant, particularly when the latter reactant is an anhydride and the other acidic reactants are acids. This latter procedure avoids the preferential reaction of the anhydride group over the carboxyl group.

The reaction zone is provided, in the normal fashion, with a reflux condenser provided with a water trap-out. This permits returning glycol to the reaction zone and discarding the water produced in the polycondensation reaction. The polycondensation reaction is carried out at elevated temperatures normal for this type of reaction, for example 400–550° F. The particular temperature is dependent upon the particular set of reactants. It is to be understood that the polycondensation reaction follows very much the normal procedure for these types of reactions.

The reaction is continued until the desired acid number (mg. KOH per gm. of polyester) is reached. Usually an acid number of 20–100 provides a very satisfactory polyester. It should be understood that some of the polyesters have a tendency to gel around an acid number of about 20 and care should be taken to avoid the gelation. Acid numbers of 40–100 generally avoid the problem with gelation.

The water-soluble polyester comprises the product produced by the reaction of the polycondensation reaction and an alkaline, water-solubilizing agent. The product and the agent are reacted until a water-soluble product is obtained. Usually enough agent is used to neutralize the acidity of the product; less may be used. The amount of alkaline reacting material is most readily determined by following the pH of the aqueous medium. The product passes into solution substantially completely at a pH of about 5. In practically all instances, the product will be in a complete solution at a pH of about 6. The use of alkaline agent in excess of that needed to bring all the product into solution is not harmful, at least up to a water solution pH of about 8. It is preferred to have the aqueous solution somewhat neutral or on the alkaline side, i.e. a pH of from 7 to 8.

The alkaline reacting agent may be ammonia, alkylamine, alkanolamine, alkali metal hydroxide or heteroamine. Ammonium hydroxide as the aqueous solution containing 20–28% ammonia is suitable. The alkylamines, particularly the lower molecular weight ones containing not more than 4 carbon atoms in each alkyl group, are suitable. The alkanolamines, such as 2-amino-2-methyl-1-propanol, ethanolamine, dimethylethanolamine, and triethanolamine, are especially suitable. Alkali metal hydroxides such as potassium hydroxide, sodium hydroxide and the like are also very suitable. The heteroamines, such as morpholine, pyridine, and piperdine may be used. The type of alkaline reacting material used is determined in part by the characteristics desired in the final water-soluble product; also, by the type of product which is to be converted to a water-soluble form.

The neutralization reaction is carried out by admixing the polycondensation product and the alkaline reacting material in water. It is preferred that water be warm, i.e., maintained in the region of 100–160° F. The mixture is agitated until the product has passed into solution. The water solutions of the water-soluble product are clear liquids which, in some instances, may exhibit an opalescent appearance. In some instances, minor amounts of alkanols such as propanol may be used to increase the amounts of solids in the aqueous solutions.

The water-soluble, unsaturated polyester provides the water compatibility for the water-insoluble, polymerizable monomer. It is to be understood that the term "water-insoluble" refers to monomers having a low solubility so as to make them impractical for use alone in water solutions. Such monomers include styrene (including hydrocarbon-substituted and chloro-substituted derivatives such as methyl styrene, dimethyl styrene, ethyl styrene, diethyl styrene and chloro styrene), an acrylic ester of an alkanol having 1–4 carbon atoms (preferably methyl), and a methacrylic ester of an alkanol having 1–4 carbon atoms (preferably methyl). Preferred, because of convenience and the beneficial results from its use, is unsubstituted styrene.

The quantities of the water-insoluble, polymerizable monomer depend on the particular monomer. With styrene, the quantities are usually sufficient to provide reaction with the unsaturation of the mono-olefinic unsaturated dicarboxyl-affording reactants. Excess quantities (up to about 4 moles per mole of the unsaturated dicarboxyl-affording reactant) are very suitable and are preferred.

In treating the sand particles, the unusual unsaturated polyester may be used in a mixture with the water-insoluble, polymerizable monomer or aqueous solutions may be prepared. Conveniently, solutions are used to better distribute the polyester and monomer among the sand particles.

Generally, the aqueous solutions contain solids ranging from minor amounts, such as 15 weight percent, up to major amounts, such as 80 weight percent. The upper limits naturally depend on the solubility characteristics of the particular polyester and monomer.

The following example illustrates one embodiment of this invention. It will be understood that this is for illustrative purposes only and does not purport to be wholly definitive with respect to conditions or scope.

*Example 1*

A water-soluble, unsaturated polyester was prepared from approximately 240 grams of trimellitic anhydride, 207 grams of isophthalic acid, 122 grams of maleic anhydride, 190 grams of propylene glycol and 335 grams of dipropylene glycol. The approximately respective mole ratio of the reactants was 1:1:1:2:2. The preparation of the polyester was carried out in a standard two-liter kettle equipped with a thermometer, sparge tube, agitator and steam-heated, partial condenser. The isophthalic acid, maleic anhydride, and glycols were initially charged to the reaction kettle and the contents of the kettle were heated to about 400–450° F. and held until an acid number of about 15–20 was reached. The kettle contents were then cooled to about 350° F. and about ½ of the trimellitic anyhdride was added. The contents were held for about 1 hour at about 350° F. and the remaining amount of trimellitic anhydride was added. The contents were then heated to about 430° F. in about 1 hour and held until an acid number of about 50–55 was reached. The contents were cooled to about 400° F. and then cut with isopropyl alcohol to approximately 72 wt. percent solids.

A sand binder was prepared by neutralizing the above polyester solution with aqueous ammonia or potassium hydroxide. The amount of solubilizer was chemically equivalent to the unreacted carboxyl groups in the polyester. Styrene (vinyl-benzene) was then added so that the weight ratio of styrene-to-polyester solids was 1:3. Enough water was added to reduce the total resin solids to 35%.

The pH of this system was checked and adjusted to approximately 7–8 with hydroxide. One and one-half percent benzoyl peroxide, based on resin solids, was dispersed in the solution, together with dimethyl aniline (promoter) (about .75% based on resin solids). The working pot life of the above system was about 4 minutes.

Enough of the above solution was added to sand (containing 10% sea water) so that the resin solids based on the sand became 2.5% to 4%. After a short time, the loose sand particles became bound together to form a hard casting. No heat was applied during the curing process.

For comparison purposes, an unsaturated polyester was prepared from approximately 488 grams of trimellitic anhydride, 125 grams of maleic anhydride and 484 grams of propylene glycol. The reactants were present in a respective mole ratio of approximately 2:1:5. In this formulation, one mole of trimellitic anhydrides was substituted for the isophthalic acid of Example I and the amount of the glycol modified accordingly. The reactants were charged to a reaction kettle and heated to approximately 350° F. and held for approximately 4 hours to an acid number of approximately 79. The heat was then turned off and ammonia and water were used to produce an aqueous solution of the polyester containing about 40% solids.

Small quantities of styrene were added to the aqueous solution and showed essentially no compatibility to produce an aqueous solution.

While the invention has been described in conjunction with specific examples thereof, these are illustrative only. Accordingly, many alternatives, modifications and variations will be apparent to those skilled in the art in the light of the foregoing description, and it is therefore intended to embrace all such alternatives, modifications and variations that fall within the spirit and scope of the appended claims.

We claim:

1. A thermosetting composition comprising
  (A) a water-soluble unsaturated polyester consisting essentially of the reaction product of
    (I) a polycondensation reaction product of
      (a) benzene tricarboxyl-affording compound,
      (b) mono-olefinic unsaturated dicarboxyl-affording compound having 4 carbon atoms in the backbone of said compound and a total of 4–5 carbon atoms,
      (c) benzene dicarboxyl-affording compound, and
      (d) $C_{2-6}$ glycol of the group consisting of alkylene glycol, ether glycol or mixtures thereof;
    said (a) and (b) being present in a respective mole ratio of about 5:1–1:5; said (c) being present in an amount of about 0.25–2 moles per mole of (a); and the amount of (d) being about 85–120 mole percent of the amount required to react with the carboxyl groups of said reactants (a), (b), and (c); said polycondensation reaction product having an acid number of about 20–100; and
    (II) an alkaline water-solubilizing agent; and
  (B) a water-insoluble, polymerizable monomer of the group consisting of styrene, $C_{1-4}$ alkyl acrylate or $C_{1-4}$ alkyl methacrylate.

2. The composition of claim 1 wherein said monomer is styrene.

3. An aqueous solution of the composition of claim 2.

4. The composition of claim 1 wherein
  (a) is about 1 mole trimellitic anhydride,
  (b) is about 1 mole maleic anhydride,
  (c) is about 1 mole isophthalic acid, and
  (d) is a mixture of about 2 moles propylene glycol and about 2 moles dipropylene glycol.

5. The composition of claim 4 wherein (B) is styrene; and the weight ratio of $A:B$ is 3:1.

6. The method of binding sandy particles in an aqueous environment at a low temperature to produce a solidified mass comprising:
  (a) preparing an aqueous solution of the composition of claim 1; and
  (b) thereafter contacting said sandy particles with said solution in the presence of a free radical-affording catalyst for a period of time sufficient to convert said thermosetting composition to a thermoset composition and thereby bind said sandy particles.

References Cited

UNITED STATES PATENTS

| | | | |
|---|---|---|---|
| 3,067,179 | 12/1962 | Frey | 260—861 |
| 3,070,256 | 12/1962 | Bremmer et al. | |
| 3,112,283 | 11/1963 | Hansen et al. | 260—40 |
| 3,252,941 | 5/1966 | Mayer et al. | 260—861 |

SAMUEL H. BLECH, *Primary Examiner.*

MURRAY TILLMAN, *Examiner.*

W. J. BRIGGS, *Assistant Examiner.*

UNITED STATES PATENT OFFICE
CERTIFICATE OF CORRECTION

Patent No. 3,355,408 November 28, 1967

James F. Mayer et al.

It is hereby certified that error appears in the above numbered patent requiring correction and that the said Letters Patent should read as corrected below.

Column 1, line 71, for "unnecessary" read -- necessary --; column 3, line 17, for "water-soluble, polymerization" read -- water-insoluble, polymerizable --.

Signed and sealed this 3rd day of December 1968.

(SEAL)
Attest:

Edward M. Fletcher, Jr.
Attesting Officer

EDWARD J. BRENNER
Commissioner of Patents